United States Patent
Branigan et al.

(10) Patent No.: US 7,299,489 B1
(45) Date of Patent: Nov. 20, 2007

(54) METHOD AND APPARATUS FOR HOST PROBING

(75) Inventors: Steven Branigan, Tinton Falls, NJ (US); Hal Joseph Burch, Pittsburgh, PA (US); William R. Cheswick, Bernardsville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/578,633

(22) Filed: May 25, 2000

(51) Int. Cl.
*H04L 29/00* (2006.01)
*H04L 29/02* (2006.01)
*H04L 29/06* (2006.01)

(52) U.S. Cl. .............. 726/2; 726/3; 726/6; 726/14; 713/168; 713/169; 713/161; 709/225; 709/224

(58) Field of Classification Search ............... 713/201
See application file for complete search history.

(56) References Cited

U.S. PATENT DOCUMENTS

| | | | |
|---|---|---|---|
| 6,108,782 A * | 8/2000 | Fletcher et al. ............ | 713/153 |
| 6,182,226 B1 * | 1/2001 | Reid et al. ................ | 713/201 |
| 6,205,551 B1 * | 3/2001 | Grosse ..................... | 713/201 |
| 6,212,561 B1 * | 4/2001 | Sitaraman et al. ......... | 709/225 |
| 6,253,337 B1 * | 6/2001 | Maloney et al. ........... | 714/38 |
| 6,298,445 B1 * | 10/2001 | Shostack et al. .......... | 713/201 |
| 6,321,264 B1 * | 11/2001 | Fletcher et al. ........... | 709/224 |
| 6,324,585 B1 * | 11/2001 | Zhang et al. .............. | 709/245 |
| 6,502,135 B1 * | 12/2002 | Munger et al. ............ | 709/225 |
| 6,546,493 B1 * | 4/2003 | Magdych et al. .......... | 713/201 |
| 6,654,882 B1 * | 11/2003 | Froutan et al. ............ | 713/153 |
| 6,658,565 B1 * | 12/2003 | Gupta et al. .............. | 713/153 |
| 6,725,378 B1 * | 4/2004 | Schuba et al. ............. | 726/13 |
| 6,826,172 B1 * | 11/2004 | Augart .................... | 370/351 |
| 2001/0050903 A1 * | 12/2001 | Vanlint .................... | 370/252 |

* cited by examiner

*Primary Examiner*—Syed A. Zia
(74) *Attorney, Agent, or Firm*—Donald P. Dinella

(57) ABSTRACT

A method and apparatus for analyzing the perimeter security of communications networks. More particularly, information is identified which defines a particular communications network, e.g., an intranet, and identifying the connected hosts thereto. Utilizing such information, a determination is made with respect to identifying the routes that define the network. Utilizing the routing information, the connectivity of the hosts within the network, e.g., an intranet, is probed to ascertain the integrity of the network and thereby identifying potential security risks across the perimeter defense of the network.

23 Claims, 2 Drawing Sheets

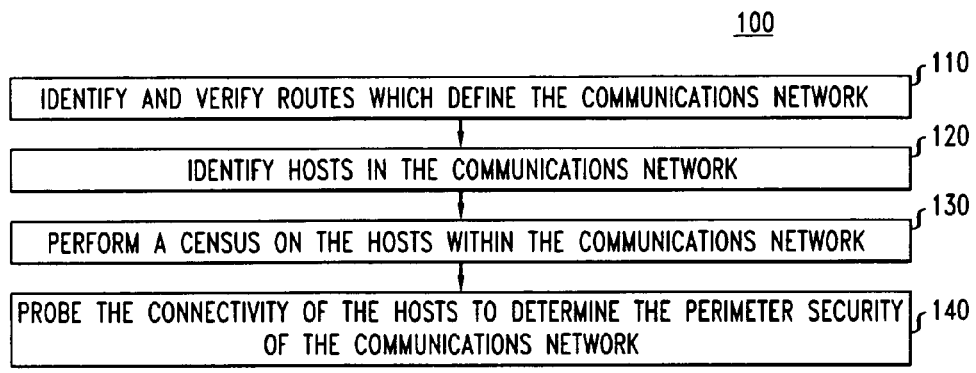
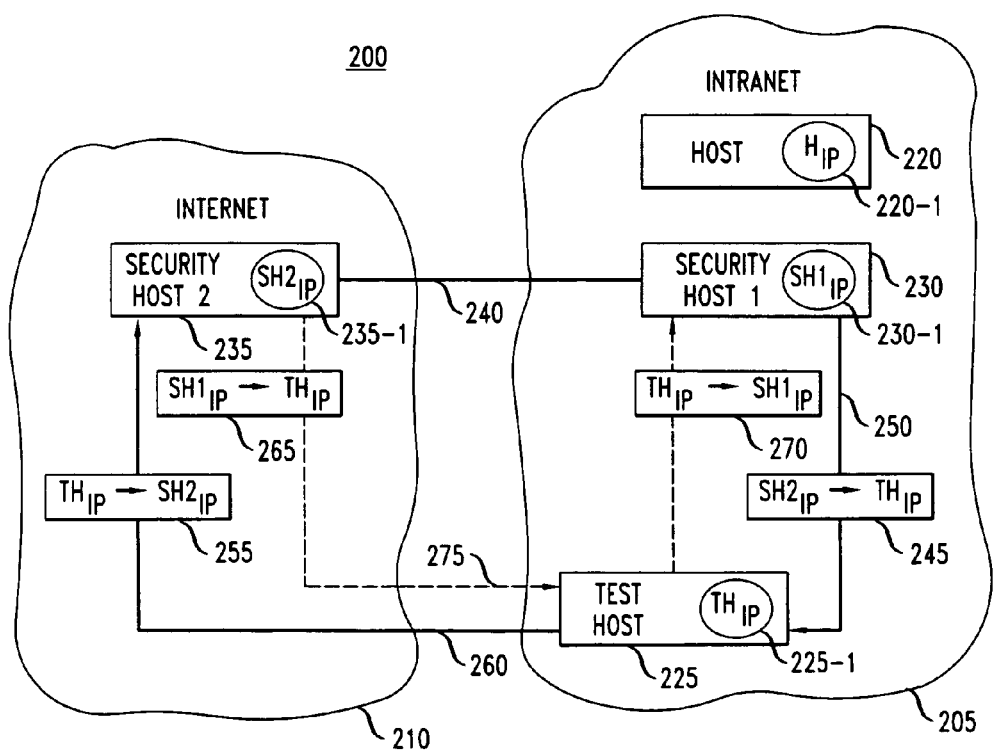

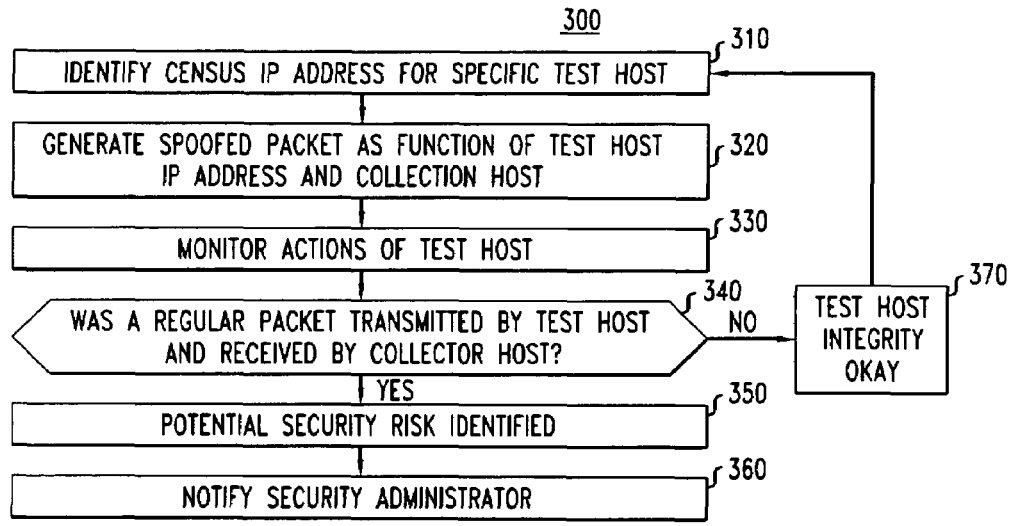

METHOD AND APPARATUS FOR HOST PROBING

FIELD OF THE INVENTION

The present invention relates to communications network security and, more particularly, to verifying and analyzing the security measures employed in such networks.

BACKGROUND OF THE INVENTION

Advances in communications technology and the availability of powerful desktop computer hardware has increased the use of computers to access a variety of publicly available computer networks. Today, a tremendous amount of information is exchanged between individual users located around the world via public computer networks, e.g., the well-known Internet. One class of users includes private individuals and professional users interconnected via a private network, e.g., a corporate intranet. The Internet, an expansive international public network of computer networks, is fast becoming an important source of information, electronic communications and electronic commerce for personal computer users in homes and businesses around the world. For example, a significant amount of information is available on a network called the World Wide Web (WWW) or the "Web". The well-known WWW is a graphical subnetwork of the Internet. Essentially, the WWW is a collection of formatted hypertext pages located in numerous computers around the world that are logically connected by the Internet. Information, i.e., content, available on the Web is displayed in the form of so-called "web pages" which are accessed by user interface programs called "web browsers". The increased exchange of information between private and public computer networks has presented a variety of critical security issues for the protection of information on private computer networks and the overall functionality of the private computer network itself.

Computer network security, at a minimum, is directed to ensuring the reliable operation of computing and networking resources, and protecting information within the network from unauthorized disclosure or access. Various security threats exist which pose increasingly difficult challenges to such network security. In particular, some of the most sophisticated types of security threats are posed by programs which exploit certain vulnerabilities within network computing systems. To name a few, these program-related security threats include well-known logic bombs, trapdoors, trojan horses, viruses and worms. Such well-known software program threats either work independently (e.g., worms) to achieve their desired security breach, or require the invocation of a host program to be invoked to perform the desired disruptive actions (e.g., trapdoors, logic bombs, trojan horses or viruses.) Indeed, there are numerous well publicized accounts of such programs being used to improperly breach the security of private computer networks and cause severe damage. Such damage has included the destruction of electronic files, alteration of databases, or the disabling of the computer network itself or computer hardware connected to the affected network.

Network administrators responsible for the operation of private computer networks employ a variety of security measures to protect the network from external security breaches such as the introduction of computer viruses. One technique uses so-called firewalls. This security scheme essentially places a separate computer system, i.e., the firewall, between the private network, e.g., corporate intranet, and the public network, e.g., the Internet. These firewalls are software-based gateways that are typically installed to protect computers on a local area network ("LAN") from attacks by outsiders, i.e., unauthorized users. The firewall maintains control over communications from and to the private network. Essentially, the firewall imposes certain security measures on all users employing the private network. For example, firewalls may block access to new Internet services or sites on the WWW because the security consequences are unknown or not accounted for by the present firewall configuration. One potential installation configuration of a firewall is that WWW clients can no longer directly contact WWW servers. Typically, this proves too restrictive, and network administrators employ so-called "proxy servers". Proxy servers are designed with certain features which provide for the forwarding of requests from WWW clients through the firewall thereby providing communication flow to and from servers on the Internet.

However, network security problems are further exacerbated by the relative ease at which new host machines or new communications links can be added to access the Internet. In particular, in the context of well-known intranets such additional new host machines and/or links can be added without consultation with the network administrator or compliance with the communications security measures on the particular intranet. As will be appreciated, such intranet security risks are especially catastrophic in the context of corporate intranets which have become integral in the computing fabric of most major corporations. As such, host machines or communications channels added to the intranet which are unregistered or unrecognizable by the security shield of the network represent tremendous opportunities for so-called "attacks" by external, unauthorized parties, e.g., so-called "hackers". Further, there exist numerous well publicized accounts of attacks launched by hackers who have improperly breached the security of private computer networks over the Internet and caused severe damage.

For example, prevention of so-called "denial of service (DOS)" attacks is becoming increasingly important as the use of the Internet becomes pervasive and this expansive network is strategically placed in the critical path of many commercial applications, e.g., electronic commerce. As will be appreciated, DOS attacks are different than the security risks discussed above, e.g., viruses, in that DOS attacks are not primarily designed to damage computer files or misappropriate an innocent party's information, but rather, such DOS attacks are primarily launched to disable a particular Internet site from operating. Essentially, DOS attacks take advantage of the inherent communications design of the Internet, in particular, the feature that messages exchanged across the Internet or WWW are presumed valid and originating from valid sources. As such, attackers launching the DOS attack use this principle to their advantage to inundate a particular Internet site with messages thereby overloading the site's ability to respond and disabling the site from operating.

To combat such network security risks, network administrators typically employ a variety of security measures to establish a so-called "self-defending network". For example, well understood filtering techniques are employed as filtering tools on routers within a network that are used to limit the amount and type of Internet protocol messages allowed to be exchanged through the communications network at any one time. Further, so-called "reverse-address lookup" is employed on routers at the edge of a communications network, e.g., a specific company's communications network, to check outgoing traffic to ensure that such traffic originates from that particular network.

Further, so-called "perimeter defenses" are employed to monitor communications networks. Essentially a perimeter defense consists of the deployment of limited connectivity to the Internet and other external networks coupled with protection of the deployed connections with firewalls. Such perimeter defenses prove very effective when used in conjunction with a limited number of hosts (e.g., 50) and are relatively straightforward to install and monitor. However, the scalability of a perimeter defense mechanism proves difficult when the number of host becomes large as is typical in the case of large size corporate intranets. This lack of scalability makes such networks employing perimeter defenses susceptible to security breaches in a variety of forms such as ad hoc links, unsecure hosts added to the network, misconfigured firewalls or connections, or "rogue" connections established without corporate security approval or detection. Thus, perimeter defenses while proving to be effective under certain circumstances and network configurations are still subject to failure and in not preventing security breaches in a variety of manners.

A need exists therefore for improving the robustness of security measures and ensuring that network security features are universally configured throughout a communications network.

SUMMARY OF THE INVENTION

An aspect of the present invention is directed to analyzing the security of communications networks. More particularly, in accordance with an aspect of the invention, information is identified which defines a particular communications network, e.g., an intranet, and identifying the connected hosts thereto. Utilizing such information, a determination is made with respect to identifying the routes that define the network. Utilizing the routing information, in accordance with an aspect of the invention, the connectivity of the hosts within the network, e.g., an intranet, is probed to ascertain the integrity of the network and thereby identifying potential security risks across the perimeter defense of the network.

In accordance with the preferred embodiment of the invention, the perimeter of a intranet is analyzed and potential security holes are identified by (i) determining the routes which define the intranet; (ii) performing a census of the hosts defining the intranet; (iii) probing, as a function of the census results, the connectivity of particular hosts to analyze the overall connectivity of such host thereby identifying potential security risks across the perimeter defense of the intranet.

BRIEF DESCRIPTION OF THE DRAWINGS

FIG. 1 a flowchart of illustrative operations for analyzing the security of communications networks in accordance with the principles of the invention;

FIG. 2 shows an illustrative communications network arrangement for analyzing network security in accordance the illustrative operations of FIG. 1;

FIG. 3 is a flowchart of illustrative operations for probing host connectivity as shown in FIG. 1; and FIG. 4 shows illustrative results from analyzing the security of a corporate intranet in accordance the principles of the invention.

Throughout this disclosure, unless otherwise noted, like elements, blocks, components or sections in the figures are denoted by the same reference designations.

DETAILED DESCRIPTION

An aspect of the present invention is directed to analyzing the security of communications networks. More particularly, in accordance with an aspect of the invention, information is identified which defines a particular communications network, e.g., an intranet, and identifying the connected hosts thereto. Utilizing such information, a determination is made with respect to identifying the routes that define the network. Utilizing the routing information, in accordance with an aspect of the invention, the connectivity of the hosts within the network, e.g., an intranet, is probed to ascertain the integrity of the network and thereby identifying potential security risks across the perimeter defense of the network.

FIG. 1 a flowchart of illustrative operations 100 for analyzing the security of communications networks in accordance with the principles of the invention. More particularly, in accordance with the preferred embodiment, routes which define the communications networks (see, FIG. 1, block 110) are identified and verified. For example, as will be appreciated an intranet may be composed of at least four types of networks: (1) networks that are directly attached to the Internet; (2) Demilitarized Zone Networks (DMZ networks) which provide limited function, high security connections between the Internet and specific intranets; (3) networks that are protected by firewalls; and (4) direct network connections with external third party networks.

As such, the intranet is operationally defined by the core routes that are distributed by the so-called backbone routers of the network, e.g., a corporate network, in which the intranet resides. For example, in a corporate network, the core routes may be distributed throughout the corporation via the well-known Open Shortest Path First (OSPF) routing protocol for communicating routing changes. As such, the core routes inform internal routers with respect to routes that are "reachable" in the internal network, and which routes are not available on the intranet. Therefore, when a destination is requested that is not advertised (i.e., reachable) by the intranet, it will be forwarded to a default route. For example, in a corporate intranet, such a default route may be to the Internet through a corporate firewall. In such an illustrative case, where the Internet is the default route, it is critical that the internal routing definition completely identify all internal routes to preserve the separation between the intranet and the Internet. Two possible failure modes in such circumstances are routing so-called "black holes" which are a range of addresses that are unreadable by the intranet, and routing so-called "leaks" to the intranet which are routes from the intranet to other networks (including, but not limited to, the Internet) that bypass the perimeter. Corporate backbone routers, through the intranet definition and firewalls, define the separation of the intranet from the Internet.

In accordance with the preferred embodiment of the invention, identification and verification of the intranet routes (see, FIG. 1, block 110) leads to the identification of the hosts, i.e. computers, in the communications network (see, FIG. 1, block 120) which is illustratively accomplished by (i) looking up so-called "announced" routes in publicly available route ownership databases to determine network ownership, i.e., ownership of the announced networks; (ii) checking for internally-announced routes that are also present in the Internet's list of announced routes; (iii) executing a conventional traceroute-like program to each announced network and collecting a listing of interior routers; and (iv) pinging the interior routers to obtain a list of routers known to each of the interior routers. The result of performing the aforementioned operations, in accordance with an embodiment of the invention, results in an output file of Classless Inter Domain Routing (CIDR) (a well-known mechanism for defining subnetworks) defining the intranet under consideration.

In looking up the announced routes, i.e., a group of IP addresses that are available via a particular router, to determine announced network ownership in accordance with the preferred embodiment, certain publicly available route ownership databases are employed as available from: the Route Arbiter Database (RADB), MCI Inc., Canet, RIPE and ANS routing information database, "whois.arin.net" for systems registered in the Americas, "whois.apnic.net" for systems registered in the Asia Pacific region, "whois.nic.ad.jp" for systems registered in Japan, "whois.aunic.net" for systems registered in Australia, and "whois.ripe.net" for systems registered in Europe, Africa and the Middle East.

Having identified the routes and hosts which define the communications network under study, e.g., intranet, a census is performed on the hosts (see, FIG. 1, block 130) of such network to establish and verify the overall size, i.e., topology, of the network itself. That is, a census is performed to count the number of systems active on the network. In accordance with an embodiment of the invention, the census is performed by (i) pinging all possible IP addresses derived from the route list, e.g., intranet route list as described above, and also probing the host located on the intranet; (ii) performing well understood DNS lookups of all the internal hosts identified in the route list; and (iii) performing further DNS lookups originating from an interface to the Internet to identify hosts internal to the intranet that are overtly exposed outside the intranet or systems that are directly connected to the Internet without firewall protection.

Utilizing the communications network definition gathered as detailed above, the perimeter security of the network is determined, in accordance with the preferred embodiment of the invention, by probing the connectivity (see, FIG. 1, block 140) of the network. That is, in accordance with an aspect of the invention, analysis of the network identifies overt penetrations of intranet perimeter and security measures thereof. For example, so-called "dual-homed hosts" can present significant security risks to a communications network. As will be appreciated, a dual-home host is a host that serves connections with a public network, e.g., the Internet, and a private network, e.g., corporate intranet. For example, a telecommuting employee of a company working at home may have a simultaneous open connection to the Internet and a virtual private network connection to the corporate intranet. As will be appreciated, such dual-homed hosts present significant security risks in such an illustrative arrangement because such hosts provide a way to bypass the security measures provided by the firewall.

As discussed above, an aspect of the present invention is directed to analyzing the security of communications networks. More particularly, in accordance with an aspect of the invention, information is identified which defines a particular communications network, e.g., an intranet, and identifying the connected hosts thereto. Utilizing such information, a determination is made with respect to identifying the routes that define the network. Utilizing the routing information, in accordance with an aspect of the invention, the connectivity of certain hosts within the network, e.g., an intranet, is probed to ascertain the integrity of the network and thereby identifying potential security risks across the perimeter defense of the network. Thus, by probing the connectivity (see, FIG. 1, block 140) of such hosts within the network, in accordance with an aspect of the invention, an analysis of the network can be made to identify potential security risks.

More particularly, turning our attention to FIG. 2 and FIG. 3, FIG. 2 shows an illustrative communications network arrangement 200 for analyzing network security in accordance the preferred embodiment of the invention, and FIG. 3 is a flowchart of illustrative operations 300 further detailing the probing of host connectivity as described above (i.e., FIG. 1, block 140). The illustrative communications network arrangement 200 of FIG. 2 includes intranet 205 which may be a corporate intranet consisting of a number of host computers, e.g., host 220, 225 230 and 235, respectively. Such hosts may have, inter alia., authorized access to Internet 210 (e.g., across communications channel 240) or may present security risks if any such host is not configured in accordance with the security parameters of intranet 205. As detailed above, the identification of such potential security risks is an important aspect of the present invention. For example, using the results of the census conducted in accordance with the preferred embodiment of the invention, the IP address of a particular test host (i.e., a computer which will be examined for proper security configuration and alternatively referred to herein as "the probed host") is identified (see, FIG. 3, block 310). For example, IP address 225-1 ($TH_{IP}$) of test host 225 of intranet 205 is identified in the census as a host machine which will be examined in accordance with the principles of the invention. As will be understood, host 220 having IP address 220-1 ($H_{IP}$) could also be the test host under examination. Thus, the security of test host 225 will be examined in accordance with an aspect of the invention to determine whether this host is a potential security risk to intranet 205 thereby also providing an indication with respect to the security of the entire topology of the network.

More particularly, in accordance with this embodiment of the invention, the IP address of the test host, e.g., test host 225, is determined from the census results gathered with respect to the network, e.g., intranet 205. That is, in accordance with an aspect of the invention, a so-called "spoofed probe packet" is generated (see, FIG. 3, block 320) as a function of the test host IP address (e.g., test host IP address 225-1) and the IP address of a so-called collector host. The collector host of the current embodiment is a host machine configured for use in the security examination with respect to the test host as is further discussed below. The spoofed probe packet, in accordance with an embodiment of the invention, includes a return address to the collector host within the external network. In accordance with an aspect of the invention, the probe packet includes at least a source address which is determined as a function of the topology of the network. That is, the source address is selected using the topology to select a source address (and an associated host) which is external to that of the test host's network. The probe packet is said to be "spoofed" because the supplied originator address of the packet is false or derived, i.e., does not originate from an actual host request. As will appreciated, the spoofed probe packets can be configured in a variety of protocols for applying the various security aspects of the invention in a variety of network configurations. For example, the spoofed probe packet of the preferred embodiment of the invention may be configured as a TCP probe packet or a UDP probe packet depending upon, e.g., the firewall policies of the network under study.

In this way, if it can be shown that the spoofed probe packet reaches the probed host this will identify a potential unsecure and/or "rogue" connection between the intranet, i.e., the probe host, and the Internet, i.e., the collector host. More particularly, if in response to receipt of the spoofed packet by test host 225 the actions of test host 225 are monitored (see, FIG. 3, block 330). Such monitoring includes determining whether test host 225 thereafter transmits, in response to receipt of spoofed packet 245, regular packet 255 to security host 235 (see, FIG. 3, block 340). As will be appreciated regular packet 255 is a packet generated in the normal course of transmission, for example, a well-known Internet Control Message Protocol (ICMP) echo request packet. In accordance with the preferred embodiment, the collector host is another host machine, e.g., security host 235, to which the spoofed packet will be addressed. As such, regular packet 255 includes a return IP address to test host 225, i.e., IP address 225-1 and IP address 235-1 ($SH2_{IP}$) of security host 235. Of course, if no packet is transmitted across communications link 260 upon receipt of spoofed packet 245 at test host 225 this serves as confirmation that the security measures of intranet 205 are functioning properly and that the integrity of test host (see, FIG. 3, block 370) is sound.

In contrast, transmission of regular packet 255 across communications link 260 through Internet 210 is indicative of a potential security risk (see, FIG. 3, block 350) and a notification of such a security risk is generated and sent to the security administrator (see, FIG. 3, block 360). In particular, link 260 may not be an authorized external connection recognized by the security measures of intranet 205 thereby potentially subjecting the entire corporate network to catastrophic failure from attacks across Internet 210. As will be appreciated, the notifications to the security administrator can be in a variety of forms, electronic or otherwise.

The illustrative embodiment discussed above is directed to a determination of the security of a test host from an internal to external perspective. That is, the probe packet transmitted (e.g., spoofed packet 245), in accordance with an aspect of the invention, is generated internally to intranet 205. In accordance with a further embodiment of the invention, the security of a test host is further determined from an external to internal perspective. More particularly, security host 235 generates a probe packet, e.g. spoofed packet 265, to IP address of 225-1 of test host 225 with the spoofed return address, i.e., IP address 230-1 ($SH1_{IP}$) of security host 230. In this further embodiment of the invention, security host 230 serves as the collector host. Thus, as before, the generation and transmission of regular packet 270 by test host 225 upon receipt of spoofed packet 265 is an indication of a potential security risk. That is, communications link 275 which carried spoofed packet 265 from the external network, i.e., Internet 210, to the internal network, i.e., intranet 205, may not be an authorized external connection recognized by the security measures (e.g., the firewall) of intranet 205. Thus, in accordance with an aspect of the invention, the potential security risk is identified to the security administrator of the network.

For example, FIG. 4 shows illustrative results 400 from analyzing the security of a portion of a particular corporate intranet in accordance the principles of the invention. In particular, perimeter security results 400 show results for three different host machines, i.e., host results 410, host results 420 and host results 430, respectively. For example, probe test 410-1 revealed that the operation "iad 2" 440 executed service "BBN IAD" service 450 thereby presenting a potential security. Similarly, probe 420-1 revealed that operation "exec" 460 executed service "remote process execution" 470 also presenting a potential security risk due to the fact that such service is a commonly exploited network service.

As detailed above, the present invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Furthermore, all examples and conditional language recited herein are principally intended expressly to be only for pedagogical purposes to aid the reader in understanding the principles of the invention and the concepts contributed by the Applicants to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flowcharts, flow diagrams, state transition diagrams, pseudocode, program code, and the like represent various processes which may be substantially represented in computer readable medium and so executed by a computer, machine, or processor, whether or not such computer, machine, or processor, is explicitly shown.

The foregoing merely illustrates the principles of the present invention. It will thus be appreciated that those skilled in the art will be able to devise various arrangements which, although not explicitly described or shown herein, embody the principles of the invention and are included within its spirit and scope.

We claim:

1. A communications network security method for ascertaining the integrity of a first communications network and identifying potential security risks across a perimeter of the first communications network, the method comprising:

identifying a plurality of routes that define the first communications network;

identifying a plurality of hosts associated with the first communications network as a function of the plurality of routes;

receiving a census of the first communications network as a function of the plurality of hosts to determine a topology of the first communications network;

probing at least one first host of the plurality hosts of the first communications network by generating and transmitting a packet to the first host, the first host being selected from the census results and the packet having at least a source address of a second host which is associated with a second communications network, wherein the source address is selected independent of any request from the second host to the first host; and determining a security characteristic of the probed first host as a function of a response by the probed first host in receiving the packet, the security characteristic being a measure of connectivity between the first communications network and the second communications network, the measure of connectivity being an indication of connectivity between the first communications network and the second communications network.

2. The method of claim 1 wherein the source address of the second host is a return IP address external to the first communications network.

3. The method of claim 2 wherein the response of the probed first host to the receipt of the packet includes transmitting a second packet, the second packet being derived using at least a portion of information from the received packet.

4. The method of claim 2 wherein the measure of connectivity is determined by the further operation of:

monitoring the probed first host to determine the response, and if the response includes a transmission of a second packet from the probed first host to the second host at the return IP address, generating a security alert message identifying the probed first host as a security risk.

5. The method of claim 3 wherein the first communications network and the second communications network have different security levels.

6. The method of claim 3 wherein the transmitted packet is a TCP packet which returns a TCP packet in response thereto.

7. The method of claim 3 wherein the second packet is a UDP packet or an ICMP packet, which returns either a UDP packet or ICMP packet in response thereto.

8. A method for analyzing network security across a perimeter of a first communications network utilizing a security host, the method comprising:

receiving a census of the first communications network;

generating and transmitting, from the security host, a packet associated with a host of a second communications network to a particular one host of a plurality of hosts internal to the first communications network, the internal host being selected from the census, and the packet having an IP source address associated with the host of the second communications network, wherein the IP source address is selected independent of any request from the host of the second communications network to the internal host of the first communications network; and determining a security characteristic of the particular one internal host of the first communications network as a function of a response by the internal host to the receipt of the packet, the security characteristic being a measure of connectivity between the first communications network and the second communications network, the measure of connectivity being an indication of connectivity between the first communications network and the second communications network.

9. The method of claim 8 wherein the measure of connectivity is a function of whether the internal host of the first communications network communicates with the host of the second communications network, and the measure of connectivity being determined by the further operation of:

monitoring the internal host to determine the response, and if the response includes a transmission of a second packet, utilizing the IP source address, from the internal host to the host of the second communications network, generating a security alert message identifying the internal host as a security risk.

10. The method of claim 9 wherein the second packet is derived using at least a portion of information from the transmitted packet.

11. The method of claim 10 wherein the internal host is a dual-homed host.

12. The method of claim 9 wherein the security characteristic includes an indication that the internal host is outside any security measures provided by a firewall associated with the first communications network.

13. A communications system for ascertaining the integrity of a first communications network and identifying potential security risks across a perimeter of the first communications network, the communications system comprising:

a first plurality of computers associated with the first communications network;

a second plurality of computers associated with a second communications network; and a security host computer which determines a security characteristic of a first computer from the first plurality of computers, the security characteristic being a measure of connectivity between the first communications network and the second communications network by probing the first computer by generating and transmitting a packet to the first computer, the first computer being selected from a census of the first communications network and the packet being generated as a function of both an IP source address associated with a second computer of the second plurality of computers, wherein said IP source address is selected independent of any request from the second computer to the first computer, and an IP address associated with the first computer, and determining the measure of connectivity as a function of a response of the first computer to receiving the packet, the measure of connectivity being an indication of connectivity between the first communications network and the second communications network.

14. The communications system of claim 13 wherein the security host computer is associated with the first communications network.

15. The communications system of claim 14 wherein the response of the first computer to the receipt of the packet includes transmitting a second packet, the second packet being derived using at least a portion of information from the received packet.

16. The communications system of claim 15 wherein the security host computer determines the measure of connectivity by monitoring the probed first computer to determine the response, and if the response includes the transmission of the second packet from the probed host, generating a security alert message identifying the first computer as a security risk.

17. The communications system of claim 14 wherein the first communications network is an intranet and the second communications network is an Internet, and the first communications network and the second communications network have different security levels.

18. A security host computer for ascertaining the integrity of a first communications network and identifying potential security risks across a perimeter of the first communications network, the security host computer comprising:
- means for performing a census of the first communications network and determining a topology of the first communications network, the topology being defined by at least one computer,
- means for probing the at least one computer by generating and transmitting a packet to the computer, the computer being selected from the census results and the packet being generated as a function of (i) the topology, (ii) an IP source address associated with a particular host computer associated with a second communications network, wherein the IP source address is selected independent of any request from the second computer to the first computer, and (iii) an IP address associated with the computer, die second communications network being separate from the first communications network; and
- a monitor for determining a security level of the computer as a function of a response by the computer to the receipt of the packet, and the security level being a measure of connectivity between the first communications network and the second communications network, the measure of connectivity being an indication of connectivity between the first communications network and the second communications network.

19. The security host computer of claim 18 wherein the measure of connectivity is determined by monitoring the computer's response, and if the response includes a transmission of a second packet, utilizing the IP source address, from the computer, a security alert message identifying the computer as a security risk is generated.

20. The security host computer of claim 19 wherein the first communications network and the second communications network have different security levels.

21. A machine-readable medium having stored thereon a plurality of instructions, the plurality of instructions including instructions that, when executed by a machine, cause the machine to perform of a method for analyzing a first communications network's integrity and identifying potential security risks across a perimeter of the first communications network by receiving a census of the first communications network; probing a first host of the first communications network by generating and transmitting a packet to the first host, the host being selected from the census results and the packet being derived as a function of a topology of the first communications network and the packet having a source address which is associated with a second host of a second communications network, wherein the source address is selected independent of any request from the second host to the first host; and determining the first communications network's integrity as a function of a response by the probed host in receiving the packet wherein the response indicates a measure of connectivity between the first communications network communicates and the second communications network, and the measure of connectivity being an indication of connectivity between the first communications network and the second communications network.

22. The machine-readable medium of claim 21 wherein the response of the probed first host to the receipt of the packet includes transmitting a second packet, the second packet being derived using at least a portion of information from the received packet.

23. The machine-readable medium of claim 22 wherein the first communications network is an intranet, and the second communications network is an Internet.

* * * * *